(12) United States Patent
Müller-Hellwig et al.

(10) Patent No.: US 10,507,424 B1
(45) Date of Patent: Dec. 17, 2019

(54) DEVICE FOR CLEANING AIR LADEN WITH CO2

(71) Applicant: AUDI AG, Ingolstadt (DE)

(72) Inventors: Simone Müller-Hellwig, Ingolstadt (DE); Roland Heigl, Eitensheim (DE); Hagen Seifert, Regensburg (DE); Alexander Krajete, Pasching (AT); Arne Seifert, Vienna (AT)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/481,276

(22) PCT Filed: Dec. 11, 2017

(86) PCT No.: PCT/EP2017/082125
§ 371 (c)(1),
(2) Date: Jul. 26, 2019

(87) PCT Pub. No.: WO2018/137831
PCT Pub. Date: Aug. 2, 2018

(30) Foreign Application Priority Data

Jan. 27, 2017 (DE) .................. 10 2017 201 367

(51) Int. Cl.
*B01D 53/04* (2006.01)
*B01D 53/047* (2006.01)
*B60H 3/06* (2006.01)

(52) U.S. Cl.
CPC ..... *B01D 53/0415* (2013.01); *B01D 53/0462* (2013.01); *B01D 53/047* (2013.01);
(Continued)

(58) Field of Classification Search
CPC .............. B01D 53/0415; B01D 53/0462; B01D 53/04; B01D 53/047; B01D 2257/504;
(Continued)

(56) References Cited

U.S. PATENT DOCUMENTS 3,594,983 A * 7/1971 Yearout ................ B01D 53/047
95/97
3,906,945 A 9/1975 Netteland
(Continued)

FOREIGN PATENT DOCUMENTS

DE 60310221 T2 9/2007
DE 102012207382 A1 11/2013
(Continued)

OTHER PUBLICATIONS

English-translation of International Preliminary Report on Patentability dated Aug. 1, 2019 in corresponding International Application No. PCT/EP2017/082125; 7 pages.
(Continued)

*Primary Examiner* — Frank M Lawrence, Jr.
(74) *Attorney, Agent, or Firm* — Maier & Maier, PLLC

(57) ABSTRACT

A device for cleaning air laden with CO2 present in an enclosed space, including at least one adsorption device for adsorbing CO2 from the air supplied to the adsorption device, a desorption device associated with the adsorption device for desorbing adsorbed CO2, and a removal device for removing the desorbed CO2.

20 Claims, 1 Drawing Sheet

(52) U.S. Cl.
CPC .. *B01D 2257/504* (2013.01); *B01D 2257/702* (2013.01); *B01D 2257/708* (2013.01); *B60H 3/0616* (2013.01); *B60H 2003/0691* (2013.01)

(58) Field of Classification Search
CPC ........ B01D 2257/702; B01D 2257/708; B60H 3/0616; B60H 3/0633; B60H 3/06; B60H 2003/0691
USPC ...... 95/96, 139; 96/121, 126, 127, 128, 134, 96/143, 144, 146
See application file for complete search history.

(56) References Cited

U.S. PATENT DOCUMENTS

| | | | | |
|---|---|---|---|---|
| 4,233,038 A | * | 11/1980 | Tao | ........................ B01D 53/04 95/104 |
| 4,472,178 A | * | 9/1984 | Kumar | ............... B01D 53/0462 95/139 |
| 5,755,857 A | * | 5/1998 | Acharya | ............ B01D 53/0462 96/122 |
| 5,906,675 A | * | 5/1999 | Jain | .................... B01D 53/0462 95/101 |
| 2004/0208804 A1 | | 10/2004 | Hall et al. | |
| 2009/0260518 A1 | * | 10/2009 | Wright | ............... B01D 53/0462 95/11 |
| 2014/0338425 A1 | * | 11/2014 | Kalbassi | .............. B01D 53/047 73/31.07 |
| 2016/0288043 A1 | | 10/2016 | Meirav et al. | |

FOREIGN PATENT DOCUMENTS

| | | |
|---|---|---|
| DE | 102014015231 A1 | 4/2016 |
| WO | 2016/038340 A1 | 3/2016 |

OTHER PUBLICATIONS

German Examination Report dated Sep. 25, 2017 in corresponding German Application No. 10 2017 201 367.2; 16 pages.
International Search Report and Written Opinion dated Feb. 22, 2018 in corresponding International Application No. PCT/EP2017/082125; 33 pages.
Response to Written Opinion filed on Sep. 24, 2018 in corresponding International Application No. PCT/EP2017/082125; 20 pages.
Written Opinion under Rule 66 dated Feb. 8, 2019 in corresponding International Application No. PCT/EP2017/082125; 15 pages.
Response to Written Opinion under Rule 66 filed on Mar. 14, 2019 in corresponding International Application No. PCT/EP2017/082125; 64 pages.

\* cited by examiner

DEVICE FOR CLEANING AIR LADEN WITH CO2

FIELD

The disclosure relates to a device for cleaning air laden with $CO_2$ present in an enclosed space, comprising two adsorption devices for the adsorbing of $CO_2$ from the air supplied to the adsorption devices, desorption devices associated with each of the adsorption devices for desorbing adsorbed $CO_2$, and respective removal devices for the removing the desorbed $CO_2$, wherein the one adsorption device is adsorbed while the other one is desorbed, and vice versa.

BACKGROUND

In spaces which are not ventilated or only inadequately ventilated, the concentration of carbon dioxide ($CO_2$) increases very heavily when people are present, since it is breathed out with the breathing air. While the $CO_2$ concentration of the ambient air is around 400 ppm, the concentration in an enclosed space may rise to 2000 ppm or more within a few minutes. Above 3000 ppm the air is felt to be unpleasant, and on occasion a slight head pressure sets in, which may lead to headache if the $CO_2$ concentration rises further. The concentrating ability also decreases with rising $CO_2$ concentration.

The smaller the space in which one or more persons are present, the more quickly a rise in $CO_2$ occurs having the mentioned disadvantages. One example of such small, enclosed spaces is the passenger compartment of a motor vehicle, i.e., the interior of the vehicle, such as a car. For example, if four or five people are present in the vehicle, a substantial amount of $CO_2$ will be liberated inside the small volume by the breathing air. Of course, it is possible to counteract the rise in $CO_2$ by supplying fresh air, e.g., by opening a window or by supplying fresh air from outside the vehicle through a ventilation device or air conditioning system. However, this is not always desirable or expedient. On the one hand, the heat or cold present in the space is lost in this way, i.e., energy has to be used once more to heat or cool the air. Furthermore, especially in the case of motor vehicles due to the surrounding conditions, it is sometimes not possible to supply fresh air, for example if this would bring pollutants from the surrounding air that are produced by other road users into the passenger compartment, or in the case of rain or snowfall or strong wind, in which cases a window cannot be opened. For this reason, a vehicle ventilation device will be operated in such cases in the so-called recirculation mode, i.e., the interior air is circulated and held at constant temperature, for example by an air conditioning system, while no fresh air or only an extremely slight amount of fresh air is supplied in this recirculation mode. Thus, no air exchange is possible here, which is associated with a corresponding rise in $CO_2$.

From U.S. Pat. No. 3,906,945 A it is known how to reduce $CO_2$ contained in the air by adsorption, for which the gas containing $CO_2$ is conveyed through a chamber containing lithium hydroxide, with which the $CO_2$ reacts in the presence of water to form lithium hydrogen carbonate. The cleaned air can again be supplied to the space.

DE 10 2012 207 382 A1 discloses a motor vehicle in which separating agents are provided for the separation of gaseous carbon dioxide from the air of the passenger compartment. In this case, air from the passenger compartment is supplied via air delivery means to the separating agents. The separating agents are suited to generating a first air stream with a lesser $CO_2$ concentration than the air of the passenger compartment and a second air stream, wherein the first air stream is delivered to the passenger compartment and the second air stream to the air surrounding the passenger compartment.

Another air conditioning device of this kind for an enclosed space in which a filter is operated in absorption and desorption phases is known from DE 10 2014 015 231 A1.

SUMMARY

The problem which the invention proposes to solve is to indicate an air cleaning device enabling an efficient, largely continuous air cleaning.

To solve the problem, in a device of the kind mentioned above it is provided that each of the adsorption devices has a filter device connected upstream or downstream from it, by means of which pollutants contained in the air to be supplied or the cleaned air to be resupplied to the space can be filtered out, and a fan is connected upstream from each adsorption device.

The cleaning device according to the disclosure proposes, first of all, a removal of the $CO_2$ by adsorption using the adsorption device. The cleaned air is again taken away via a removal device, i.e., it can be supplied once more to the space without any problems. The removal device, in this case, is thus a device for supplying the cleaned air into the space.

Furthermore, the device includes a desorption device, which serves for the regeneration of the adsorption agent of the adsorption device that is laden with $CO_2$. Thanks to this desorption device, the $CO_2$ adsorbed on the adsorption agent is once more driven out and removed, so that the adsorption agent is again ready for capturing $CO_2$. Thus, the adsorption device can at once clean the air again without requiring a replacement of the adsorption agent or the like. The desorbed $CO_2$ is taken out via a suitable removal device, and the removal device of course ensures that the $CO_2$ does not get back into the enclosed space.

With such a device, a longer lasting recirculation mode is possible for example in the motor vehicle described as an example, since on the one hand the adsorption device is able to bind $CO_2$ for a relatively long time, and therefore clean the air. Moreover, a fast regeneration of the adsorption agent can occur through the desorption device, so that it is ready for use almost continuously, except for the short regeneration period. The desorbed $CO_2$ is removed, while on the other hand the cleaned air is continuously returned to the space via a corresponding supplying device.

The adsorption devices themselves preferably comprise respectively a housing filled with an adsorption agent, to which the air laden with $CO_2$ can be supplied respectively via a conveying device, such as a suitable fan, through an air supply line. The adsorption agent may be for example a solid adsorber material based on inorganic materials such as $Al_2O_3$ or aluminum silicate. One can also use supported material with inorganic/organic matrix. The mentioned materials make it possible to bind $CO_2$ from the surrounding air by a regenerative and preferably physisorptive process. They can be regenerated at moderate regeneration temperatures (preferably 60-200° C.), i.e., the desorption can occur at these relatively low temperatures, which is possible with relatively low energy expense and therefore advantageously. Moreover, they have high stability, so that many regeneration cycles can be performed without resulting in any degradation, or any nuisance odor. Neither are these materials toxic. The list of usable adsorption agents, preferably present in powder or granulate form, is not exhaustive, but instead any absorption agent can be used which on the one hand possesses a sufficient absorption capacity and on the other hand is also suitable for the respective purpose of use of the device and in particular can be regenerated with relatively low energy expense.

If the device is used in a motor vehicle, the vehicle can therefore be driven for a long time in the recirculation on account of the ongoing $CO_2$ reduction in the compartment air. Autonomous driving is also possible, in which no outside air and thus no pollutants produced by other road users is taken in from the outside air and distributed inside the vehicle. This is especially advantageous for use of a motor vehicle in areas with high air pollution, whether due to pollutants or due to particulates or the like, By means of the removal device, as described, the desorbed $CO_2$ is removed. For this, according to one expedient modification, a transport gas can be delivered to the adsorption devices by means of the removal device and the mixture of transport gas and desorbed, i.e., once again gaseous $CO_2$ can be removed via a respective exhaust air line. The housing in which the adsorption, but also the desorption occurs, is consequently incorporated in a corresponding ducting system, so that on the one hand the air to be cleaned can be supplied, but on the other hand so too can the transport gas for taking away the desorbed $CO_2$. Corresponding lines are also provided at the outlet end, namely, on the one hand a return line for the cleaned air to the space, and on the other hand the exhaust air line. Of course, corresponding valve devices or the like are provided in order to switch the respective air pathways.

The supplied transport gas thus carries along the $CO_2$, and the gas mixture is taken away via the exhaust air line. The transport gas here may either be drawn, e.g., by means of a conveying device or directly from a transport gas reservoir, such as a transport gas cartridge, or it may be outside air, which is drawn off from outside the closed space. This is easily possible, since the transport gas serves only for taking away the $CO_2$ and in no case gets into the space.

The desorption may occur in various ways. On the one hand, the desorption may comprise a heating device for heating the adsorption agent and/or a device for reducing the pressure in the adsorption device or the adsorption agent, in which case a heating to around 100-150° C. is generally sufficient to quickly desorb the $CO_2$. The heating device here may heat only the adsorption agent or the entire housing in which the adsorption agent is contained, i.e., the adsorption cartridge. Once the heating is ended, the adsorption agent cools down and can then capture $CO_2$ once more.

Alternatively, a device for reducing the pressure in the adsorption device may be provided. Thus, a corresponding negative pressure is generated in the adsorption device or the housing containing the adsorption agent, which has the effect that the merely adsorbed $CO_2$ is evaporated once again. For this, of course, the adsorption device or the housing, i.e., the adsorption cartridge, is hermetically sealed off by suitable valves so that the negative pressure can be generated.

Finally, there is the possibility of providing a device for the supply and conveying of a gas causing the desorption through the adsorption device. Thus, the desorption here is performed with the aid of a conveyed gas which takes up and carries along the only loosely bound $CO_2$.

Of course, it is also possible to provide several of these adsorption options, for example, the heating in conjunction with the supply of a gas, said gas constituting simultaneously the already described transport gas. Interior air may also be used as the transport gas, i.e., air drawn off from the closed space. This is because the gas quantity required for this is not too large.

According to the invention, a filter device is connected upstream or downstream from each of the adsorption devices, by means of which pollutants contained in the air to be supplied or the cleaned air to be supplied again to the space can be filtered out. Thus, besides the $CO_2$ cleaning, an air cleaning in regard to other undesired components is also done. The filter devices are designed for example for filtering NO, $NO_2$, CO, particulates, hydrocarbons, and/or volatile organic substances, that is, one or more additional harmful substances can be filtered from the air by means of this filter device, in addition to the $CO_2$. These filter devices, for example in the form of molecular sieves, zeolites, etc., may be situated upstream or downstream from the adsorption device, i.e., either the adsorption housing itself, or the adsorption agent, and optionally in the adsorption housing.

As described above, it is conceivable to provide only one adsorption device which is operated discontinuously when it is being desorbed, i.e., regenerated, since an adsorption is temporarily not possible when the desorption is being done, i.e., when the adsorption agent is being heated, for example. In this case, the adsorption is briefly interrupted, until the $CO_2$ has been for the most part or entirely desorbed or taken away. After this, the adsorption process may be resumed again at once.

According to the invention, it is provided that two adsorption devices are provided, each associated with a desorption device and removal device, wherein the one adsorption device is adsorbed while the other is desorbed, and vice versa. Thus, thanks to the redundant arrangement of two adsorption devices plus associated desorption devices and removal devices, a continuous adsorption mode is provided here, because there is always one adsorption device in adsorption mode, while the other is being desorbed, and vice versa. In this way, continuous adsorbing can be done, since there is always one adsorption device available.

Besides the device itself, the invention moreover relates to a motor vehicle including a passenger compartment forming an enclosed space and a device for cleaning air laden with $CO_2$ that is present in the passenger compartment in the above described manner.

Furthermore, a ventilation device can be provided, especially including an air conditioning system, which can be operated in a recirculation mode, and which is connected to the device for cleaning the air in such a way that air withdrawn from the passenger compartment can be supplied to the device and cleaned air can be returned to the passenger compartment.

Depending on which kind of adsorption agent is being used, i.e., its adsorption capacity, and how large a quantity of adsorption agent is chosen, it is easily possible to realize a recirculation mode of 60 minutes or even significantly more in a motor vehicle according to the invention, without having to supply fresh air. This noticeably enhances the ride comfort, especially in areas with corresponding air pollution. A further factor is that other pollutants or strong odors can be filtered out from the air by the corresponding filter device with the device according to the invention or in the motor vehicle according to the invention. The air cleaning also constitutes an advantage in terms of driving safety, since the fatigue resulting from increased $CO_2$ concentration in the vehicle, even to the point of a potential momentary drowsing which can lead to accidents, is prevented.

BRIEF DESCRIPTION OF THE DRAWINGS

Further benefits and details of the present disclosure will emerge from the following exemplary embodiments, as well as the drawings. There are shown.

DETAILED DESCRIPTION

Figure 1:
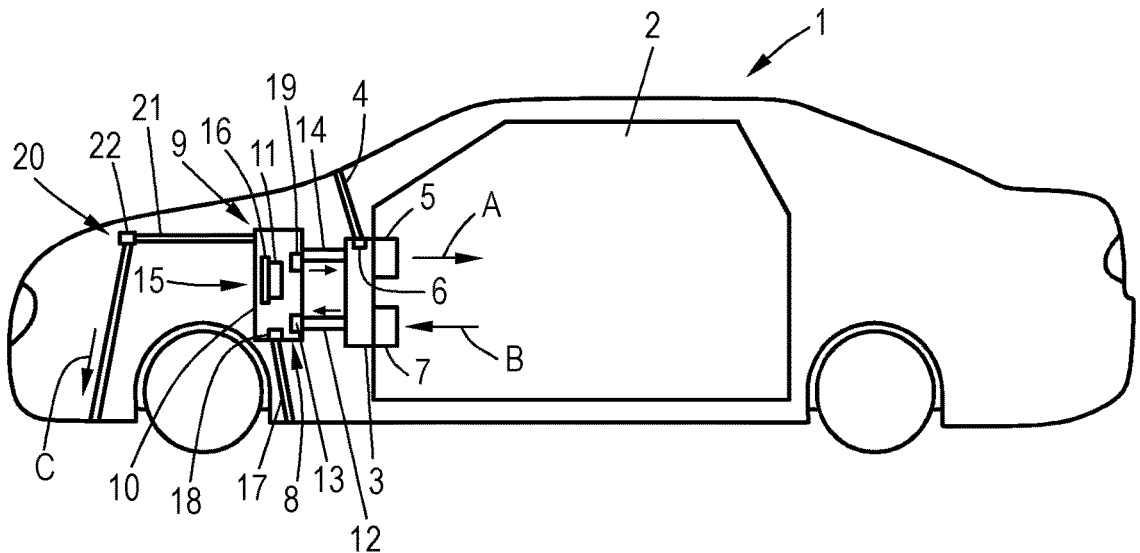
FIG. 1 a schematic diagram of a motor vehicle with an air cleaning device of a first embodiment, and FIG. 2 a schematic diagram of an air cleaning device of a second embodiment.

FIG. 1 shows a motor vehicle 1, comprising a passenger compartment 2 forming an enclosed space with coordinated ventilation device 3, such as one in the form of or comprising an air conditioning system. In normal operation, outside air is drawn in through one or more air supply lines 4 and, optionally after air conditioning, it is delivered through one or more air outlets 5 to the passenger compartment 2, as shown by the arrow A.

However, the ventilation device 3 may also be operated in a recirculation mode, in which case the air supply line 4 is closed by a valve device 6. By the ventilation device 3, which naturally has one or more suitable fans or blowers or the like, air is drawn in from the space 2, as shown by arrow B. The intake occurs through one or more intake inlets 7.

The air taken in and laden with $CO_2$ is supplied to a device 8 for the cleaning of $CO_2$ from the air. The device 8 comprises an adsorption device 9, such as one in the form of an adsorption cartridge comprising a housing 10 with an adsorption agent 11 located therein. By a supply line 12, the air laden with $CO_2$ and delivered by means of a fan or the like is supplied to the housing 10. In housing 10 a filter device 13 is provided which filters out other pollutants contained in the supplied air, such as NO, $NO_2$, CO or particulates or the like. The air laden with $CO_2$ then goes to the housing 10 and makes contact with the adsorption agent 11, on which the $CO_2$ contained in the air is adsorbed. The cleaned air is again delivered via a return line 14 across the ventilation device 3 and the air outlet or outlets 5 to the interior space. Thus, a circulation of air occurs here, no outside air is delivered to the passenger compartment 2, only the interior air is circulated during the cleaning.

Over time, the adsorption agent becomes laden with $CO_2$. In order to regenerate its adsorption properties once more, a desorption device 15 is provided, being in the form of a heating device 16 here, which makes it possible to heat the adsorption agent 11 to a temperature at which the adsorptively bound $CO_2$ again becomes desorbed, i.e., it is released from the adsorption agent 11 and evaporates into the surroundings. In order to export this $CO_2$ from the adsorption device 9, a transport gas is conveyed into the housing 10, which may be air of the interior space, for example, being supplied via the supply line 12 or of the exterior space being supplied via the supply line 17. This supply line 17 is coordinated with a valve device 18, which is only opened when air from the outside needs to be supplied in order to export the desorbed $CO_2$. The return line 14 in this case is closed by a valve element 19 in order to prevent desorbed $CO_2$ from getting into the interior space.

A removal device 20 is provided for removing, comprising a drain line 21, which is coordinated with a valve device 22. This drain line 21 is only opened by the valve device 22 when desorbed $CO_2$ needs to be taken away. The air to be taken away, and laden with desorbed $CO_2$, is conveyed to the outside as shown by the arrow C.

As soon as the regeneration is ended, i.e., the desorption device 15 or the heating device 16 has been switched off, the supply of the transport gas, whether interior air or outside air, is ended and the drain line 21 is closed. The adsorption agent 11 is regenerated, i.e., it can once again capture $CO_2$ from the circulating interior air in the now continuing recirculation mode, and this until such time as the next desorption cycle occurs. The degree of the $CO_2$ loading of the adsorption agent 11 can either be measured by a suitable measurement device, not otherwise shown, or ascertained with the aid of the period during which the vehicle is operated in the recirculation mode and therefore an adsorption is taking place.

Figure 2:
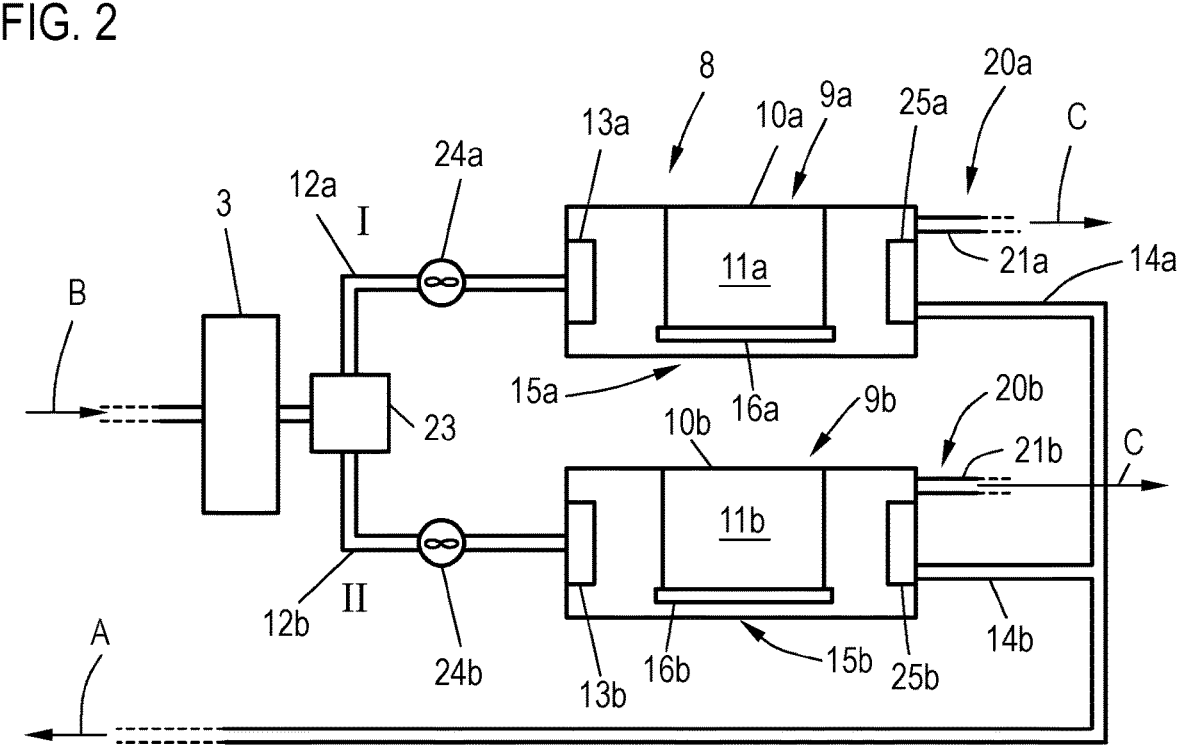

FIG. 1 shows, as described, a motor vehicle having only one adsorption device 9. FIG. 2, on the other hand, shows a device 8 for cleaning air that has two separate adsorption devices 9a, 9b, associated with separate desorption devices 15a, 15b, and for example heating devices 16a, 16b, and also associated with corresponding removal devices 20a, 20b. Thus, two redundant systems are provided here, yet they work basically in the same manner as that described in FIG. 1. Consequently, as regards the basic principle one may refer to the embodiment in FIG. 1, including the supply of any transport gas, etc., even though not otherwise shown here.

Thus, in this embodiment, air from the interior space is drawn in through the ventilation device 3, possibly through its air conditioning system, in recirculation mode, as shown by the arrow B. Downstream from this is a valve device 23, which serves for conveying the air taken in and delivered respectively through the supply lines 12a, 12b either to the cleaning branch I or the cleaning branch II. The further delivery occurs, for example, through corresponding fans 24a, 24b, which are coordinated with the respective cleaning branches I, II. Since each adsorption device 9a, 9b has an upstream filter device 13a, 13b, once again a filtration of any pollutants occurs. Corresponding valve devices 25a, 25b are provided at the outlets of the respective adsorption devices 9a, 9b or their housings 10a, 10b, which depending on the operating mode either convey the outgoing air to the return line 14a or 14b, when it involves cleaned air, or convey the desorbed $CO_2$ containing air to the drain lines 21a, 21b and remove it (see arrow C). The return lines 14a, 14b are merged, and the cleaned air, as shown by arrow A, can be returned to the interior space. Of course, the two drain lines 21a, 21b may also be coupled together afterwards and lead to a common outlet.

In operation, either the cleaning branch I or the cleaning branch II works in adsorption mode while the other respective cleaning branch II or I works in desorption mode. That is, adsorbing done in one branch, while desorbing thus regenerating is done in the other one. Therefore, in each case a fully functional adsorption device is available with a regenerated or $CO_2$ capturing adsorption agent 11a or 11b.

The control of the individual components occurs via one or more control devices, not otherwise shown here. These control the corresponding operation of the desorption devices 15, 15a, 15b or the different valve devices 18, 19, 22, 23, 25a, 25b, for example. Possibly the various fans or blowers or the operation of the ventilation device 3 are also controlled in this way.

The adsorption devices 9, 9a, 9b are preferably designed in the form of compact cartridges, having corresponding inlets and outlets at which the corresponding lines can be attached. The corresponding filter devices 13, 13a, 13b may be present inside the cartridges or situated outside them.

Preferably, these filter devices are disposable filters, which can be replaced during the normal vehicle maintenance. However, these filter devices are not absolutely necessary.

The invention claimed is:

1. A device for cleaning air laden with $CO_2$ present in an enclosed space, comprising:
   two adsorption devices for the adsorbing of $CO_2$ from the air supplied to the adsorption devices, desorption devices each of which is associated with a respective one of the adsorption devices for desorbing adsorbed $CO_2$, and respective removal devices for removing the desorbed $CO_2$, wherein the one adsorption device is adsorbed while the other one is desorbed, and vice versa, characterized in that a filter device is connected upstream or downstream from each of the adsorption devices, by means of which pollutants contained in the air to be supplied or the cleaned air be supplied again to the space can be filtered out and first and second fans are connected upstream from each adsorption device, respectively.

2. The device according to claim 1, wherein each of the adsorption devices comprises a housing filled with an adsorption agent, to which the $CO_2$ laden air can be supplied, transported via a conveying device, across a respective air supply line.

3. The device according to claim 1, wherein a transport gas can be delivered to the adsorption devices by means of the removal devices and the mixture of transport gas and $CO_2$ can be removed via a respective exhaust air line.

4. The device according to claim 3, wherein each of the removal devices further comprises a conveying device for the delivery of the transport gas from a transport gas reservoir or from outside or inside the enclosed space.

5. The device according to claim 3, wherein an opening valve device is provided in each of the exhaust air lines for removing the mixture, or that such a valve device is provided upstream from each of the exhaust air lines.

6. The device according to claim 1, wherein each of the desorption devices comprises a heating device for heating the adsorption agent and/or a device for reducing the pressure in the adsorption devices and/or a device for supplying and conveying a gas causing the desorption through the adsorption devices.

7. The device according to claim 1, wherein the filter devices are designed for filtering NO, $NO_2$, CO, particulates, hydrocarbons, and/or volatile organic substances.

8. The device according to claim 1, wherein a valve device is connected upstream from the two adsorption devices, by which the air to be supplied can be supplied to either the one or the other adsorption device.

9. A motor vehicle, comprising a passenger compartment forming an enclosed space and a device for cleaning air laden with $CO_2$ present in an enclosed space according to one of the preceding claims.

10. The motor vehicle according to claim 9, wherein a ventilation device is provided, comprising an air conditioning system, which can be operated in a recirculation mode, and which is connected to the device for cleaning the air in such a way that air withdrawn from the passenger compartment can be supplied to the device and cleaned air can be returned to the passenger compartment.

11. The device according to claim 2, wherein a transport gas can be delivered to the adsorption devices by means of the removal device and the mixture of transport gas and $CO_2$ can be removed via a respective exhaust air line.

12. The device according to claim 4, wherein an opening valve device is provided in each of the exhaust air lines for removing the mixture, or that such a valve device is provided upstream from each of the exhaust air lines.

13. The device according to claim 2, wherein each of the desorption devices comprises a heating device for heating the adsorption agent and/or a device for reducing the pressure in the adsorption devices and/or a device for supplying and conveying a gas causing the desorption through the adsorption devices.

14. The device according to claim 3, wherein each of the desorption devices comprises a heating device for heating the adsorption agent and/or a device for reducing the pressure in the adsorption devices and/or a device for supplying and conveying a gas causing the desorption through the adsorption devices.

15. The device according to claim 4, wherein each of the desorption devices comprises a heating device for heating the adsorption agent and/or a device for reducing the pressure in the adsorption devices and/or a device for supplying and conveying a gas causing the desorption through the adsorption devices.

16. The device according to claim 5, wherein each of the desorption devices comprises a heating device for heating the adsorption agent and/or a device for reducing the pressure in the adsorption devices and/or a device for supplying and conveying a gas causing the desorption through the adsorption devices.

17. The device according to claim 2, wherein the filter devices are designed for filtering NO, $NO_2$, CO, particulates, hydrocarbons, and/or volatile organic substances.

18. The device according to claim 3, wherein the filter devices are designed for filtering NO, $NO_2$, CO, particulates, hydrocarbons, and/or volatile organic substances.

19. The device according to claim 4, wherein the filter devices are designed for filtering NO, $NO_2$, CO, particulates, hydrocarbons, and/or volatile organic substances.

20. The device according to claim 5, wherein the filter devices are designed for filtering NO, $NO_2$, CO, particulates, hydrocarbons, and/or volatile organic substances.

* * * * *